April 21, 1936. G. A. NEW 2,037,995
ACOUSTICAL PLASTER COMPOSITION
Filed April 22, 1933
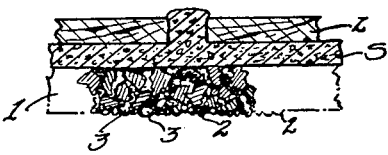
Fig. 1 — Newly applied
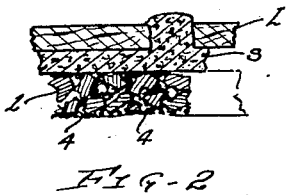
Fig. 2 — after working
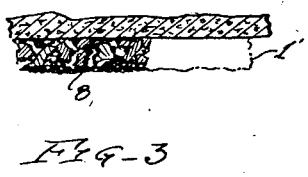
Fig. 3 — Set but not hardened
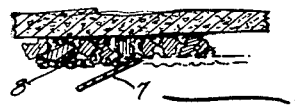
Fig. 4 — Trowel — remove film
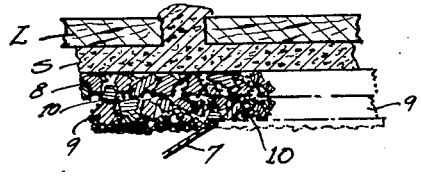
Fig. 5
INVENTOR
Gustave A. New
BY Soule v Leonard
ATTORNEYS Patented Apr. 21, 1936

2,037,995

UNITED STATES PATENT OFFICE 2,037,995

ACOUSTICAL PLASTER COMPOSITION

Gustave Adolph New, Cleveland, Ohio, assignor to John E. Rooney, Cleveland, Ohio Application April 22, 1933, Serial No. 667,466

4 Claims. (Cl. 106—84)

This invention relates to an acoustical plaster composition and is particularly concerned with an acoustical plaster which is sufficiently hard and durable to withstand without damage the impacts and abrasion to which exposed side walls of schoolrooms, public buildings and the like are subjected in general use.

One object is to provide a plaster composition of this character which may be applied by troweling into place and which, when dry, will have a high acoustical value.

An equally important object is to provide a plaster composition which may be applied as a base layer and to which within a very short interval after such application and before hardening of the applied layer, an additional layer may be added and efficiently bonded.

Another object is to provide a plaster composition which is comparatively inexpensive and which will accomplish these results when mixed and applied at the work site by workmen of average skill and under the more or less variable working conditions encountered in the actual field practice.

Other objects and advantages will become apparent from the following specification wherein a composition and method of applying the same which embody the principles of the present invention are disclosed and illustrated in the drawing.

In the drawing:

Fig. 1 is a diagrammatic illustration of one step of the present invention.

Fig. 2 is a diagrammatic illustration of a resultant wall after completion thereof.

Figs. 3, 4 and 5 illustrate diagrammatically successive steps in applying the acoustical plaster in separate layers in such a manner as to form a resultant substantially homogeneous single layer.

Heretofore, plaster compositions having equally high acoustical values have been devised, but the high acoustical coefficient has been obtained therewith only when such compositions were carefully compounded, mixed, applied and dried or cured under the ideal conditions of the laboratory and on the bench of the workshop. When these same compositions are mixed and applied at the work site, entirely different results are obtained and many serious disadvantages become manifest.

As one example, an attempt has been made to form an acoustical plaster comprising a granular filler of uniform size, each granule of which is very irregular in contour and characterized by numerous angular projections. These are mixed with a suitable cementitious binder and the plastic mass applied or poured into a mold. The theory of operation is that the angular projections of each granule will contact with those of adjacent granules and maintain the granules spaced apart, thus providing a vast number of voids therebetween, and that upon hardening of the cementitious binder, a very porous structure, filled with a vast number of air cells and passages between the granules, will result.

This result is, in fact, effected when the granules and binder are carefully mixed and poured into place on a table or into test blocks and lightly troweled as is done on the bench in workshop where the mass does not have to support its own weight. However, in applying plaster to a wall, considerable trowel pressure is necessary to obtain the required suction for supporting the mass. Consequently, when such plaster is applied by troweling, the conjoint effect of the pressure and rubbing motion of the trowel displaces the particles and causes them to roll about one another with the resultant effects of somewhat selectively fitting each of the projections of each particle into cavities of adjacent particles and bringing the faces of the particles into contact. Such a plaster therefore becomes greatly compacted and dense, the voids and passages are destroyed or materially reduced, and the resultant coefficient of absorption is reduced to half or less of that obtained on the workshop bench. This reduction in the coefficient has been verified by results obtained in the practical construction field.

An additional example will serve additionally to render the marked advantages of the present invention more clear. A plaster has been developed in which a base layer is formed of a finer graded aggregate and a surface layer of a coarser graded aggregate, the first layer being poured into a mold or lightly troweled into place and allowed to set partially in order to obtain support, and the second layer poured or lightly troweled on at a later date. The coarser graded aggregate is for providing sufficient voids for acoustical purpose while the finer aggregate provides a more dense base layer. Here again, when a layer of the finer aggregate plaster is placed carefully for a test plaque on the workbench and carefully spread in place and the layer of coarser aggregate then added and also carefully and lightly spread, good results are obtained. However, upon applying the first acoustical layer in the field, heavy troweling pressure is required and this renders the base layer additionally dense. If the coarse layer is then applied, even heavier pressure is required to effect bonding and this not only disturbs the arrangement and relative positions of the coarse granules but forces them into the base layer. Again the density is increased and the acoustical value reduced.

An equally serious disadvantage of this type of plaster is the fact that a considerable time must be permitted to elapse between the time that the base layer of the acoustical material is applied and the surface layer of acoustical material added. This practically requires the removal of the scaffolding upon completion of the base acoustical layer on part of the wall and a subsequent resetting of the scaffolding at the same position at a later date. Such is true also in applying the heat insulating and acoustic plaster described in Letters Patent of the United States, No. 1,839,887, issued to me on January 5, 1932, wherein a base coat of insulating plaster is applied, over which, when dry, a coat of acoustical plaster is spread. These operations incur unnecessary additional expense.

The plaster composition with which the present invention is concerned, when applied in more than one layer, obviates the necessity for such delay between the application of the base layer and the surface layer and permits the application of the latter on the former after setting but before hardening of the base acoustical layer, for example within 1½ to 2 hours.

As an illustrative example of the ingredients and proportional amounts thereof for forming a plaster composition by which the enumerated and other advantages are obtained, the following approximately one ton mix has been found highly effective.

| | | Pounds |
|---|---|---|
| (a) | Stucco (calcium sulphate) | 900 |
| (b) | Asbestos shorts | 100 |
| (c) | "Zonolite" | 100 |
| (d) | Slag | 900 |
| (e) | Retarder | 4 |
| (f) | Soap bark | 20 |

The composition is mixed thoroughly when dry and water is added at the work site as in the case of ordinary plaster to produce a plaster mix of the desired consistency.

The stucco utilized is preferably a stucco which has a higher tensile strength, when cured, than stucco of the quality more commonly used in ordinary plasters. Since a comparatively large proportion of this quality of stucco is used in the composition, a surface film having a comparatively high tensile strength is formed on the surface, especially on ceilings, and also about the bubbles of occluded gases and air occasioned by the foaming agent and entrained in the mass. This surface film results from the fact that a certain amount of the stucco or calcium sulphate is dissolved in the mixing water, and when the wet mass is applied to walls (especially to ceilings) an excess of the water or that portion which has not been absorbed by the ingredients of the acoustical plaster will separate and flow through to the outer surface, and during setting or hardening of the mass, will form a dense film. When hard, this film will close up or seal the open ends of a majority of the passages which are necessary for obtaining high acoustical values. The surface tension and film are such that ordinarily the entrained or occluded gas or air bubbles cannot burst their enclosing walls without mechanical and extraneous assistance and consequently a highly intumesced mass is formed. Extraneous assistance for bursting the bubble walls is rendered by the method of application as hereinafter described.

Asbestos shorts are used to provide slip and impart plasticity to the mass. If unduly increased, the shorts render the mass mushy and increase the drying time disproportionately, and if decreased, reduce the slip of the mass.

The "Zonolite" renders the mass somewhat lighter in weight and increases the spread and also adds to the acoustical properties but primarily to the thermal insulation characteristics of the mix. An increase therein decreases workability, and a decrease shortens the spread. "Zonolite" is the trade name of a non-metallic mineral composed of silica, magnesia and alumina and is found in Montana, and the term is herein used for brevity in describing this substance as an example of exfoliated vermiculite.

The slag used is preferably granulated slag, known in the market as "popcorn" slag and is produced as waste by the steel industry, the granules of which will pass a #8 screen and be retained on a #50 screen, the finer particles being discarded. Such slag granules, though light in weight, are sufficiently large and hard to be troweled firmly into place without crushing and thus prevent undue compression of the plaster when being applied.

The retarder may be any one of several well known varieties but of such a character as not to react chemically with any of the other ingredients except the stucco and water which latter, for purposes of discussion, is not considered an ingredient but only a transitory substance. In fact, each of the ingredients used should be such as not to react chemically with any of the others except stucco and water, as such a mix will give more uniform and constant results.

As a foaming or entraining agent, soap bark, finely powdered, is preferred as it can be mixed more readily and uniformly with the other ingredients and the particles are more uniform in size and quality than those of the mineral and other commercial foaming and gassing agents and consequently produce a more uniform result in the finished product. However, a gassing agent such as described in my Patent No. 1,745,635, issued February 4, 1930 may be substituted for soap bark or used therewith. Other gassing agents may be used, for instance, an acid salt such as aluminum sulphate plus a carbonaceous salt such as sodium bi-carbonate, the two being mixed in equal parts. For the exemplary mix above specified about 80 pounds of such gassing agent would be used and the soap bark preferably dispensed with in such case. If a gassing agent is used the mass is applied while the agent is active.

Throughout the claims the word "gases" has been used in its more general sense to include both gases produced by such an agent, or air, which latter, of course, is composed of numerous gases.

All of the ingredients enumerated have the additional advantage of being of low cost and readily procurable.

The proportions of the various ingredients may be varied somewhat and effective results obtained.

The plaster may be applied as a single application or layer of ½" in thickness as illustrated in Figs. 1 and 2. When so applied, it may be placed and spread with a wooden or rough surface float instead of the usual smooth metal trowel. When first applied and spread a coat of plaster such as indicated at 1 in Fig. 1 results. A portion of the water and calcium sulphate coming to the surface forms a tenacious surface film 2 which retains the occluded air and gas bubbles 3 in the mass. Additional working of the surface breaks up or destroys this film 2 to a degree sufficient to cause the bubbles 3 to burst, thus opening the interior voids and passages into communication with the atmosphere through the exposed plaster surface, as illustrated in Fig. 2, resulting in passages indicated at 4. The wood float engages the imbedded aggregate particles with sufficient force to disturb or move the coarser particles which, in turn, disturb the smaller particles. This movement assists the occluded or entrained gases or air in bursting through their surrounding surface films so that passages are formed along and at an angle to the faces of the aggregate granules and otherwise throughout the mass. Such floating also reduces the surface film of the applied mass so that a sand finish of the exposed surface results and many of the passages open onto the surface. When so applied, a finished and dried layer of the composition of ½" thickness will effect an acoustical coefficient of 21%.

This coefficient can be controlled, however, and increased. If an acoustical coefficient of from 30% to 35% is desired, it may be obtained from the same mixture but applied in a different manner. For example, a base acoustical layer ¼" thick may be applied into place by the usual troweling method. After this base layer has set, but before it becomes hard, as illustrated in Fig. 3, for instance within ½ to 1 hour after application, under average weather conditions, the exposed surface is "broomed" and scraped with the trowel edge 7 to remove the surface film 8 and to allow the gases to burst through to the surface as illustrated in Fig. 4. Since the layer is only ¼" thick, the trowel edge scraping operation engages the aggregate particles and displaces them for their full depth, thus mechanically forming voids within the mass.

Within 1½ to 2 hours after scraping, a second layer 9 about ¼" in thickness is similarly applied, and the same steps above described repeated as to the second layer.

A surface film does not form on the inner surface of the outer finish layer and consequently the passages in the final product may extend from one layer into the next as indicated at 10 and the layers form substantially a single continuous or homogeneous layer of acoustical plaster.

As set forth in my co-pending application, wherein the action of the ingredients herein described is fully set forth, the acoustical plaster layer or layers are placed on the usual sand plaster base coating S applied to the usual lathes L, which coating being generally used in all cases, is considered part of the wall surface and therefore not specifically referred to herein.

The sound absorbing value or coefficient may be considerably increased by penetrating the surface of the applied plaster, before it is set, with a stippling brush or other suitable tool in portions in which the passages have not opened as much as desirable onto the surface.

Since the fillers used in the composition are light and the mass is expanded by gases or air entrained by the soap bark and thus rendered still lighter, as heavy a troweling pressure as is commonly required with heavy plasters is unnecessary and consequently the expanded mass is not unduly compressed.

Since the surface film, which is too tough to be broken by the occluded gases unassisted, is scraped away and destroyed in whole or part, and the aggregate disturbed at the same time by the scraping action the gas and air bubbles burst through a great portion of their surrounding surface films and provide a vast number of intercommunicating passages throughout the mass and a vast number of passages intercommunicating with these and opening onto the exposed surface of the final product.

While this bursting of the bubbles and forming of the passages opening onto the surface is partially mechanical, a chemical action takes places within the interior of the mass which cooperates and assists in bursting of the bubbles and forming intercommunicating passages. When a mixture containing stucco as a binder, a sharp aggregate or filler, such as partly opened slag, and a porous material, such as "Zonolite", is mixed with a foaming agent and with water a vast number of air bubbles are produced throughout the mass as compared with the results obtained by ordinary dense sand or other aggregate having no sharp cleavage wherein only a small number of bubbles is produced. The binder, however, will entrap the air cells within the mass by forming a thin stucco film around the same. The stucco sets hard through crystallization, that is, during the hardening process a large amount of calcium sulphate crystals are formed, which, when this chemical process is completed, has resulted in a mass of interwoven or interlocked crystals. Through this clustering or interlocking of these crystals and the accompanying friction therebetween a considerable amount of heat is produced throughout the mass. This heat in turn heats the air bubbles causing expansion thereof to a degree such that they burst the thin film of the binder and the surface tension by which they are entrapped, thus leaving a plurality of passages throughout the whole mass instead of mere isolated cells.

Regardless of which method of application is used a comparatively hard and very durable and stable homogeneous product having the advantages enumerated and of uniform quality will result even though the plaster is applied under various weather conditions.

Having thus described my invention, I claim:
1. A dry mix composition that on gaging with water forms a plastic mass capable of application to walls, ceilings and the like by troweling and which sets to form an acoustical sound absorbing plaster comprising by weight about eight to ten parts stucco, eight to ten parts slag, asbestos shorts 0.8 to 1.1 parts, exfoliated vermiculite 0.8 to 1.1 parts, a small amount of retarder and soap bark 0.15 to 0.25 parts.

2. A dry mix composition that on gaging with water forms a plastic mass capable of application to walls, ceilings and the like by troweling and which sets to form an acoustical sound absorbing plaster comprising, by weight, calcium sulphate and light lithic material in substantially equal parts, asbestos shorts and exfoliated vermiculite each in the ratio of 0.8 to 1.1 parts of stucco, a retarder, and a foaming agent of saponin type, the foaming agent being in proportion by weight to the stucco in a ratio 1 part to 45 parts.

3. A dry mix composition that on gaging with water forms a plastic mass capable of application to walls, ceilings and the like by troweling and which sets to form an acoustical sound absorbing plaster comprising by weight about nine parts of stucco of high tensile strength, nine parts of hard intumesced slag, about one part asbestos shorts, one part of expanded inert filler, a small amount of retarder and about 0.8 parts of a gassing agent.

4. A dry mix composition that on gaging with water forms a plastic mass capable of application to walls, ceilings and the like by troweling and which sets to form an acoustical sound absorbing plaster comprising by weight about eight to ten parts stucco, eight to ten parts slag, asbestos shorts 0.8 to 1.1 parts, exfoliated vermiculite 0.8 to 1.1 parts, a small amount of retarder and a gassing agent 0.7 to 0.9 parts.

GUSTAVE ADOLPH NEW.